United States Patent [19]

Muller

[11] 4,267,674
[45] May 19, 1981

[54] GUARD STRUCTURE FOR FLUID CONDUITS OF HYDRAULIC CYLINDERS OF MOBILE APPARATUS

[75] Inventor: Thomas P. Muller, Aurora, Ill.

[73] Assignee: Caterpillar Tractor Co., Peoria, Ill.

[21] Appl. No.: 98,145

[22] Filed: Jul. 16, 1979

[51] Int. Cl.³ .................................................. B66C 23/06
[52] U.S. Cl. ....................................... 52/115; 137/377; 248/635; 414/918
[58] Field of Search ......................... 52/115, 116, 117; 138/110; 285/45; 137/377, 378; 248/66, 68 R, 73, 632, 635; 414/918

[56] References Cited
U.S. PATENT DOCUMENTS

T974,001 9/1978 Neal ............................ 137/377 X

Primary Examiner—Carl D. Friedman
Attorney, Agent, or Firm—Wegner, Stellman, McCord, Wiles & Wood

[57] ABSTRACT

A mobile apparatus (20) has a pivoted boom (22), and hydraulic cylinders (23a and 23b) flank the boom for moving it about its pivotal mounting (22a). Head end conduits (31a and 31b) and rod end conduits (33a and 33b) which connect the cylinders to a hydraulic pressure source are protected by guard means (35) including a unitary, rigid guard member (38) which is mounted upon the cylinders (23a and 23b) by mounting means (41) which affords limited movement of the guard member (38) relative to the cylinders (23a and 23b) in the plane of a central guard plate (39) and axially of mounting bolts (48).

9 Claims, 6 Drawing Figures

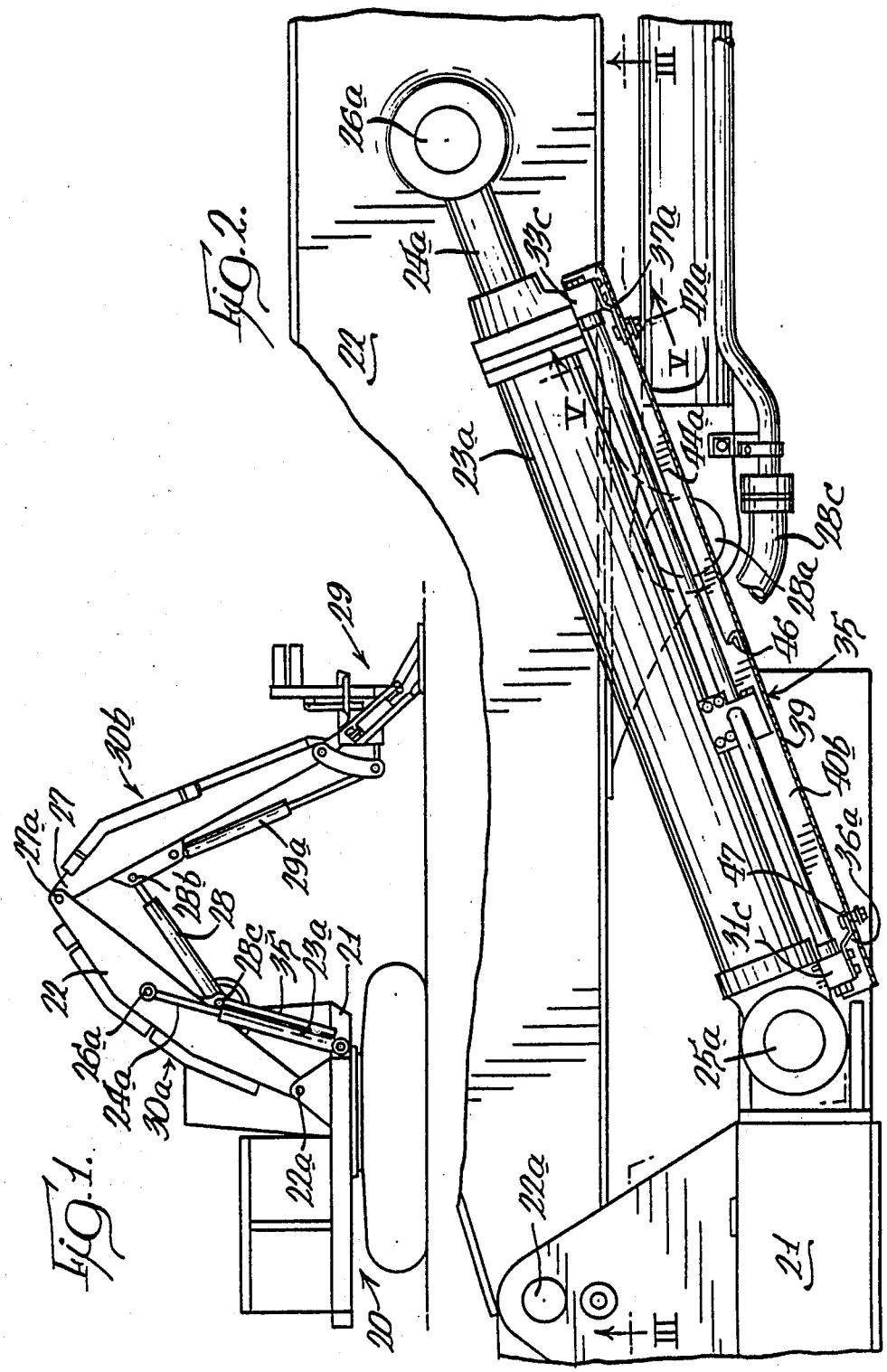

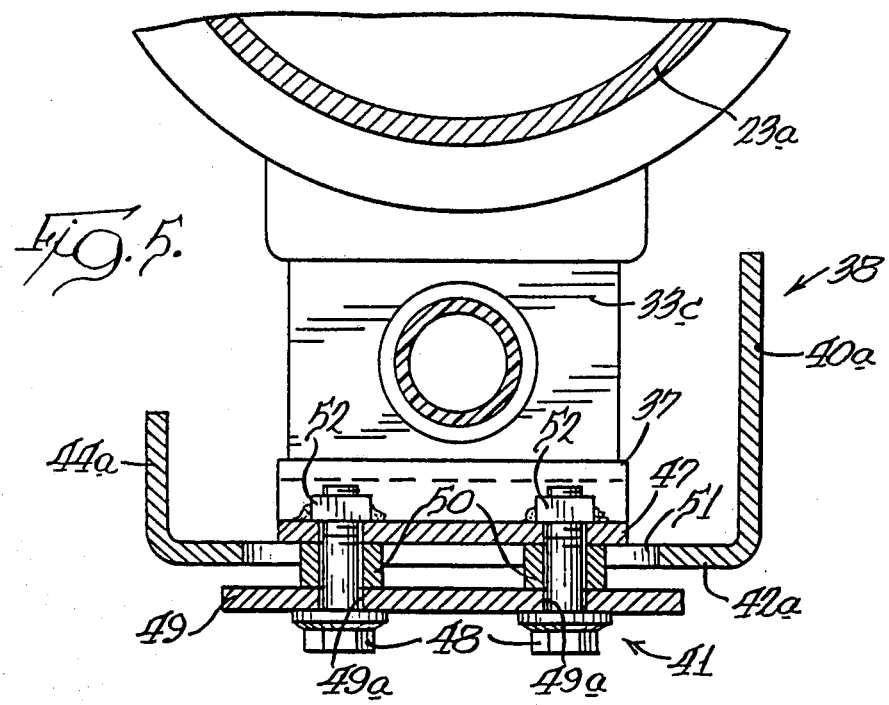
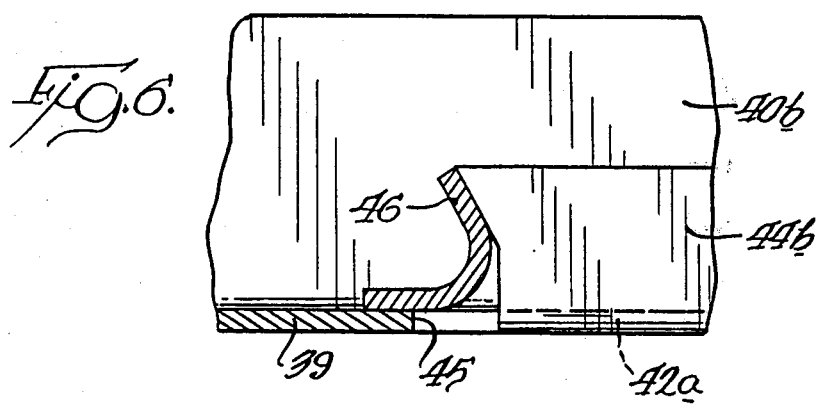

GUARD STRUCTURE FOR FLUID CONDUITS OF HYDRAULIC CYLINDERS OF MOBILE APPARATUS

TECHNICAL FIELD

This invention relates to a guard structure for protecting the hydraulic conduits which supply operating fluid to hydraulic cylinders which flank a pivoted boom of a mobile apparatus such as a hydraulic excavator, tree harvester, grapple, or the like.

BACKGROUND ART

There are various types of mobile devices which are used for handling, or manipulating heavy loads. Many of them, like hydraulic excavators, have a chassis on which a boom member is pivotally mounted, there is an arm member pivoted at the free end of the boom, and an excavator bucket or other hydraulically operated apparatus is at the free end of the arm. Hydraulically operated mechanisms mounted on such devices in place of excavator buckets include tree harvesting devices, log grapples, hydraulic impact hammers, pile drivers or earth compactors, etc. Hydraulic conduits must be mounted on the boom and the arm.

The booms of such devices have hydraulic cylinders at their two sides to pivot the boom relative to the chassis, and problems of manufacturing tolerances and operating conditions require that the hydraulic cylinders be mounted on the chassis on spherical mounting joints and that the piston rods of the cylinders be operatively attached to the sides of the boom by spherical connecting joints. The cylinders and the hydraulic fluid conduits connected to their head ends and their rod ends are exposed to substantial risk of damaging impact in the rough environments in which the devices are used, so a guard structure is essential, particularly for the conduits and conduit couplings.

The entire guard structure must be mounted upon the two hydraulic cylinders, and the axial rotation of the cylinders relative to one another makes it difficult to develop a satisfactory mounting for the guard structure. The problem is complicated by the fact that a single cylinder for moving the arm on the end of the boom has its flexible hydraulic conduits extending along the underside of the boom, and the guard for the boom cylinder conduits must not interfere with free movement of the flexible conduits for the arm.

In the prior art known to applicant, the boom cylinder conduit guard has been fabricated from a pliable material, such as heavy sheet rubber. Such guards are expensive, and not particularly satisfactory because the sheet rubber can be relatively easily torn or ruptured.

DISCLOSURE OF INVENTION

The present invention is directed to overcoming one or more of the problems as set forth above.

According to the present invention, a mobile apparatus having a chassis has a boom pivotally mounted on the chassis, and hydraulic cylinders with piston rods at the two sides of the boom, spherical mounting joints attaching the cylinders to the chassis and spherical connecting joints operatively attaching the rods to the sides of the boom. Conduits and couplings connect the head ends of the cylinder and the rod ends of the cylinders to a hydraulic pressure source on the chassis. Guard means for the conduits and couplings includes brackets fixedly supported on the head ends of the cylinders and the rod ends of the cylinders that support a unitary, rigid guard member which has a central plate spanning the cylinders and their conduits and couplings, and side webs which flank the cylinders, conduits and couplings. Mounting means which supports the guard member on the bracket includes bolts and spacer means affording limited movement of the guard member relative to the cylinders transversely in the plane of the central plate and axially of the bolts.

In order to accommodate the flexible conduits for the arm cylinder, the central plate of the guard member has an outer end portion which is bifurcated to provide an elongated opening through which those flexible conduits extend.

BRIEF DESCRIPTION OF DRAWINGS

FIG. 1 is a schematic side elevational view of a tree harvesting apparatus supplied with the guard structure of the present invention;

FIG. 2 is a fragmentary side elevational view on an enlarged scale with the guard member shown in longitudinal section to illustrate the conduits and connections for one of the two boom cylinders and the guard mounting brackets on that cylinder;

FIG. 3 is a bottom plan view with the guard removed from the brackets, taken substantially as indicated along the line III—III of FIG. 2;

FIG. 4 is a plan view of the guard member;

FIG. 5 is a fragmentary sectional view on an enlarged scale taken substantially as indicated along the line V—V of FIG. 2; and FIG. 6 is a fragmentary sectional view on an enlarged scale taken substantially as indicated along the line VI—VI of FIG. 4.

BEST MODE FOR CARRYING OUT THE INVENTION

Figures 3, 4:
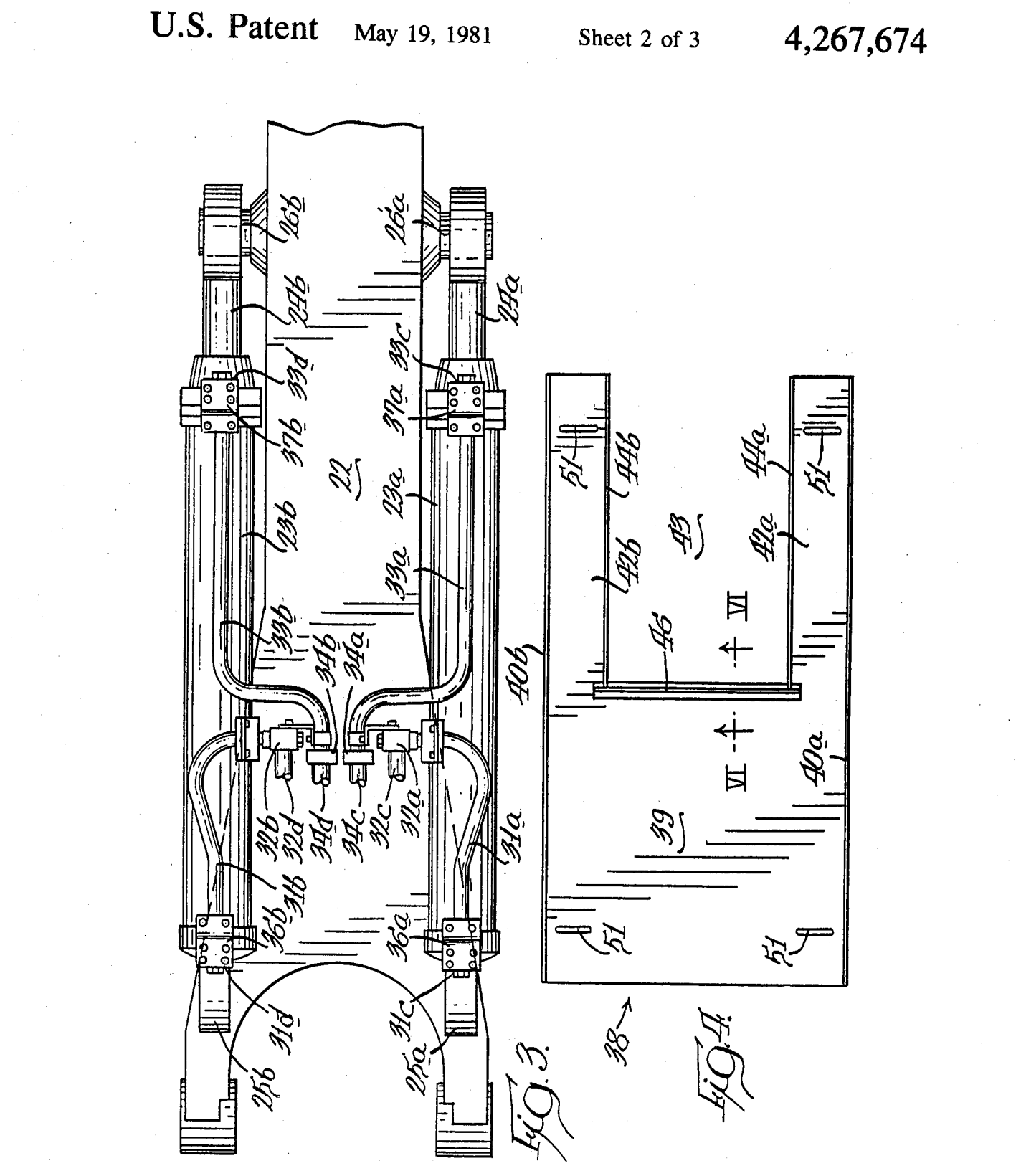

Referring first to FIG. 1 of the drawings, the apparatus of the present invention is illustrated as applied to a tree harvester of the kind disclosed in U.S. Pat. No. 4,108,224, owned by applicant's assignee. A track-type vehicle, indicated generally at 20, includes a chassis 21 upon which a boom 22 is pivotally mounted at 22a. As seen in FIG. 3, a pair of hydraulic cylinders 23a and 23b with respective piston rods 24a and 24b are positioned at the two sides of the boom 22 to swing the boom about its pivotal connection on the chassis. Spherical mounting joints 25a and 25b attach the respective cylinders 23a and 23b to the chassis 21, and spherical connecting joints 26a and 26b operatively attach the rods 24a and 24b to the sides of the boom 22.

The apparatus also includes an arm 27 pivotally connected at 27a to the outer end of the boom, a hydraulic cylinder unit 28 pivoted at 28a on the boom and pivotally connected at 28b to the arm for moving the arm relative to the boom, and a hydraulic working head, which is illustrated in the drawing as a tree harvester mechanism 29, pivoted on the free end of the arm and controlled by a tilt cylinder 29a. Conduits (not shown) for the tree harvester mechanism 29 and the tilt cylinder 29a surmount the boom 22 and the arm 27 and are protected by guard structures 30a on the boom and 30b on the arm.

Referring now particularly to FIGS. 2 and 3, first conduits 31a and 31b, together with respective fixtures 31c and 31d on the head ends of the cylinders 23a and 23b, are connected through respective couplings 32a and 32b and flexible hoses 32c and 32d with a hydraulic pressure source (not shown) on the chassis 21. The rod ends of the respective cylinders 23a and 23b connect through conduits 33a and 33b having fixtures 33c and 33d, respectively, with couplings 34a and 34b for flexible hoses 34c and 34d which also connect with the hydraulic pressure source on the chassis.

The apparatus as described up to this point constitutes the environment in which the present invention functions. The present invention constitutes guard means, indicated generally at 35, including first brackets 36a and 36b which are secured, respectively, to the fixtures 31c and 31d, and second brackets 37a and 37b which are secured, respectively, to the fixtures 33c and 33d. A unitary, rigid guard member, indicated generally at 38, has a central plate 39 which spans the cylinders 23a and 23b, the first and second conduits 31a-31b and 33a-33b, and the first and second couplings 32a-32b and 34a-34b. Side webs 40a and 40b on the guard member 38 flank all of the cylinders, conduits and couplings.

Mounting means, indicated generally at 41, support the guard member 38 for limited movement on the first and second brackets and will be described in detail hereinafter with reference to FIG. 5.

The central plate 39 of the guard member 38 extends from the brackets 36a and 36b to a line past the couplings 32a-32b and 34a-34b, and beyond that line the plate 39 is bifurcated to afford spaced plates 42a and 42b that flank a central opening 43 and are provided with respective shallow inner side webs 44a and 44b. A transverse edge 45 of the central plate 39 between the two side plates inner webs 44a and 44b is best seen in FIG. 6 to be provided with a web forming a smoothly curved lip 46 to minimize damage to hydraulic pressure hoses 28c for the arm cylinder 28 the position of which with reference to the lip 46 is seen in FIG. 2.

Referring now particularly to FIG. 5, the mounting means 41 for supporting the guard member 38 on the brackets 36a-36b and 37a-37b consist of four identical assemblies which connect to downwardly offset arms 47 of said four brackets. A pair of mounting bolts 48 extend through a rectangular bar 49 having holes 49a which are slightly larger than the shanks of the bolts 48, and through spacer sleeves 50 which seat in a transverse slot 51 in the guard member 38 and bear against the underside of the bracket arm 47. The bolts screw into nuts 52 which are welded onto the top surface of the offset bracket arm 47. The mountings at the four corners of the guard member 38 are all identical to what is described above with reference to FIG. 5. The mounting means affords limited movement of the guard member 38 relative to the cylinders 23a and 23b transversely in the plane of the central plate 39, and axially of the bolts 48.

INDUSTRIAL APPLICABILITY

The guard structure of the present invention permits limited relative motion between the unitary, rigid guard member 38 and the hydraulic boom cylinders 23a and 23b to accommodate relative movement between the cylinders that can occur in operation. The guard member can be fabricated of heavy sheet steel to provide a degree of protection for the conduits and couplings which is far superior to what has been known in the prior art. In addition, the bifurcated construction of the outer end portion of the guard member, and the curved lip 46 across the end of the opening 43, minimize damage to the flexible conduits for the arm control cylinder 28.

I claim:

1. In a mobile apparatus (20) having a chassis (21), a boom (22) pivotally mounted (22a) on said chassis, hydraulic cylinders (23a and 23b) with piston rods (24a and 24b) at the two sides of said boom (22), spherical mounting joints (25a and 25b) attaching the cylinders (23a and 23b) to the chassis, spherical connecting joints (26a and 26b) operatively attaching the rods (24a and 24b) to the sides of the boom (22), first conduits (31a and 31b) with fixtures (31c and 31d) and couplings (32a and 32b) for connecting the head ends of said cylinders (23a and 23b) to a hydraulic pressure source on the chassis (21), and second conduits (33a and 33b) with fixtures (33c and 33d) and couplings (34a and 34b) for connecting the rod ends of said cylinders (23a and 23b) to said hydraulic pressure source, guard means (35) for said conduits (31a-31b and 33a-33b) and couplings (32a-32b and 34a-34b) comprising, in combination:

first brackets (36a and 36b) fixedly supported on the head ends of said cylinders (23a and 23b) immediately adjacent said first conduit fixtures (31c and 31d);

second brackets (37a and 37b) fixedly supported on the rod ends of said cylinders (23a and 23b) immediately adjacent said second conduit fixtures (33c and 33d);

a unitary, rigid guard member (38) which has a central plate (39) spanning the cylinders (23a and 23b), the first and second conduits (31a and 31b-33a and 33b) and the first and second couplings (32a and 32b-34a and 34b) and side webs (40a and 40b) flanking all of said cylinders, conduits and couplings;

and mounting means (41) supporting said guard member (38) on said first (36a-36b) and second (37a-37b) brackets, said mounting means (41) including bolts (48) and spacer means (49-50-51) affording limited movement of said guard member (38) relative to said cylinders (23a and 23b) transversely in the plane of the central plate (39) and axially of the bolts (48).

2. The combination of claim 1 in which the first brackets (36a and 36b) are mounted upon the first conduit fixtures (31c and 31d), and the second brackets (37a and 37b) are mounted upon the second conduit fixtures (33c and 33d).

3. The combination of claim 2 in which the mounting means (41) comprises four identical mounting assemblies, and each such assembly includes a pair of spacer collars (50) which extend through a transverse slot (51) in the central plate (39) of the guard member and seat on the underside of a bracket (36a or 36b or 37a or 37b), a bar (49) seated on said collars (50) and having holes (49a) axially aligned with the collars, a pair of bolts (48) each of which has a shank extending loosely through one of said holes (49a) and spacer collars (50) and a head seated on the bar (49), and nuts (52) welded to the topside of said bracket (36a or 36b or 37a or 37b) into which a bolt (48) is screwed.

4. The combination of claim 3 in which each bracket has a downwardly offset arm (47), and the nuts (52) are welded to said arm (47).

5. The combination of claim 1 in which the mounting means (41) comprises four identical mounting assemblies, and each such assembly comprises a spacer collar (50) which extends loosely through an opening (51) in the central plate (39) of the guard member (38) and seats on the underside of a bracket (36a and 36b or 37a or 37b), a nut (52) on the topside of said bracket aligned with the axis of the collar (50), a bolt (48) having a shank which extends loosely through the collar (50) and screws into the nut (52) to clamp the collar (50) to said bracket (36a or 36b or 37a or 37b), and means (49) cooperating with the bolt (48) to limit movement of the guard member (38) axially of the bolt (48).

6. The combination of claim 1 in which the mobile apparatus (20) includes an arm (27) pivotally mounted (27a) on the free end of the boom (22), a cylinder unit (28) pivotally mounted (28a) on the underside of the boom (22) and having a piston rod pivotally connected (28b) to the arm (27), and flexible conduits (28c) beneath the boom (22) operatively connecting the cylinder unit (28) to the hydraulic pressure source on the chassis (21), and in which the central plate (39) of the guard member (38) has a bifurcated outer end portion defining spaced side plates (42a and 42b) beneath the respective cylinders (23a and 23b) and flanking an opening (43) through which the flexible conduits (28c) extend.

7. The combination of claim 6 in which the side plates (42a and 42b) have upright inner webs (44a and 44b) along the sides of the opening (43).

8. The combination of claim 7 in which the opening (43) has a transverse margin (45) between the inner webs (44a and 44b), and a web in the form of an arcuate lip (46) extending along said transverse margin (45) provides a curved protective surface for the flexible conduits (28c).

9. The combination of claim 6 in which the opening (43) has a transverse margin (45) between the side plates (42a and 42b), and said transverse margin (45) and the inner margins of the side plates (42a and 42b) are provided with upturned webs (46 and 44a and 44b) providing protective surfaces for the flexible conduits (28c).

* * * * *